US010745522B2

(12) United States Patent
Jeol et al.

(10) Patent No.: US 10,745,522 B2
(45) Date of Patent: Aug. 18, 2020

(54) METHOD FOR THE MANUFACTURE OF POLY(ARYL ETHERS) USING AT LEAST ONE ORGANIC BASE

(71) Applicant: SOLVAY SPECIALTY POLYMERS USA, LLC, Alpharetta, GA (US)

(72) Inventors: Stéphane Jeol, Cumming, GA (US); Chantal Louis, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 15/521,218

(22) PCT Filed: Oct. 15, 2015

(86) PCT No.: PCT/EP2015/073828
§ 371 (c)(1),
(2) Date: Apr. 21, 2017

(87) PCT Pub. No.: WO2016/062597
PCT Pub. Date: Apr. 28, 2016

(65) Prior Publication Data
US 2017/0355821 A1  Dec. 14, 2017

Related U.S. Application Data

(60) Provisional application No. 62/068,276, filed on Oct. 24, 2014.

(51) Int. Cl.
| | | |
|---|---|---|
| *C08G 75/23* | (2006.01) | |
| *C08G 65/40* | (2006.01) | |
| *C08G 75/00* | (2006.01) | |
| *C08G 75/20* | (2016.01) | |
| *C08G 65/46* | (2006.01) | |

(52) U.S. Cl.
CPC ............ *C08G 75/23* (2013.01); *C08G 65/40* (2013.01); *C08G 65/4081* (2013.01); *C08G 65/4087* (2013.01); *C08G 65/4093* (2013.01); *C08G 65/46* (2013.01); *C08G 75/00* (2013.01); *C08G 75/20* (2013.01); *C08G 2650/40* (2013.01)

(58) Field of Classification Search
CPC .................... C08G 75/23; C08G 65/4012
See application file for complete search history.

(56) References Cited

U.S. PATENT DOCUMENTS

| | | | | | |
|---|---|---|---|---|---|
| 3,634,355 | A * | 1/1972 | Barr et al. | ............ | C08G 65/38 525/390 |
| 4,232,142 | A * | 11/1980 | Barr | .................. | C07C 45/64 528/125 |
| 5,013,815 | A * | 5/1991 | Genz | ..................... | C08G 75/23 528/171 |
| 5,239,043 | A * | 8/1993 | Savariar | ................. | C08G 75/23 528/125 |
| 5,969,082 | A * | 10/1999 | Kuwahara | .......... | B01D 67/0088 523/122 |
| 6,365,678 | B1 * | 4/2002 | Reuter | ................... | C08G 75/20 525/409 |
| 6,548,622 | B1 * | 4/2003 | Goldfinger | ............ | C08G 75/20 528/171 |
| 2007/0135609 | A1 * | 6/2007 | Carrillo | ................. | C08G 65/44 528/86 |
| 2008/0114149 | A1 | 5/2008 | Moore et al. | | |
| 2009/0177014 | A1 * | 7/2009 | Rogl | ..................... | C07C 17/263 568/316 |
| 2011/0311816 | A1 * | 12/2011 | Kanomata | .............. | C08G 65/40 428/402 |
| 2015/0183918 | A1 * | 7/2015 | Le | ......................... | C08G 61/127 528/125 |
| 2016/0002431 | A1 * | 1/2016 | Bajjuri | .................... | C08J 11/08 524/876 |

FOREIGN PATENT DOCUMENTS

JP          53073298 A          6/1978

OTHER PUBLICATIONS

Machine Translation of JP 53-073298, 2018 (Year: 2018).*
Johnson et al., Journal of Polymer Science: Part A-1, vol. 5, 2415-2427, 1967 (Year: 1967).*
El-Hibri et al., Polysuflones, Encyclopedia of Polymer Science and Technology, 2001 (Year: 2001).*
Nishikubo T. et al., "Synthesis of polymers in aqueous solutions: synthesis of polyethers by reactions of bisphenols with bis(4-chloro-3-nitrophenyl) sulfone using various bases in aqueous solutions", High Performance Polymers, 1999, vol. 11 No. 3, pp. 263-271.
Garaleh, M. et al, "Multicyclic Poly(ether sulfone)s Derived from Tris(4-hydroxyphenyl)ethane" Macromol. Chem. Phys, 2007, vol. 208, pp. 747-755.—WILEY-VCH Verlag GmbH & Co.

* cited by examiner

*Primary Examiner* — Liam J Heincer

(57) ABSTRACT

The present invention relates to a method for the manufacture of a poly(aryl ether) such as a poly(aryl ethersulfone) or a poly(aryl ether ketone) including the use of an organic base having a pKa of at least 10.

18 Claims, No Drawings

METHOD FOR THE MANUFACTURE OF POLY(ARYL ETHERS) USING AT LEAST ONE ORGANIC BASE

CROSS-REFERENCE TO RELATED APPLICATION

The present application claims priority to U.S. Provisional Application No. 62/068,276, filed Oct. 24, 2014, which is incorporated by reference herein in its entirety.

FIELD OF THE INVENTION

The present invention relates to an improved method for the environmentally friendly manufacture of a poly(aryl ether) such as a poly(aryl ether sulfone) or a poly(aryl ether ketone) carried out in the presence of a specific organic base.

BACKGROUND

Poly(aryl ether sulfones) (PAES) and poly(aryl ether ketones) (PAEK) have been known for many years. PAES are tough linear polymers that possess a number of outstanding features such as excellent high temperature resistance, good electrical properties, and very good hydrolytic stability. Among the commercially available poly(aryl ether sulfones), one can notably mention Udel® polysulfone (PSU) which is a rigid, high-strength, semi-tough, transparent plastic that offers high heat resistance and hydrolytic stability, Veradel® polyethersulfone (PESU) which combines good chemical resistance with a high heat deflection temperature and inherent flame retardancy and Radel® polyphenylsulfone (PPSU) which delivers the highest performance among sulfone polymers, offering better impact resistance and chemical resistance than polysulfone (PSU). On the other hand, the highest performing semi-crystalline thermoplastics available today is KetaSpire® PEEK (polyetheretherketone) which possesses exceptional properties such as extraordinary chemical resistance, excellent strength, and superior fatigue resistance.

Many PAES and PAEK manufacturing processes have been investigated in the past. The most advantageous ones involve the use of organic solvents and inorganic bases such as sodium or potassium carbonate. Unfortunately, these processes come with several drawbacks including the recycling of organic solvents, the difficult recovery of the polymers including purification/extraction steps where insoluble salts have to be separated from the polymers and the high cost related to the processing of the salts.

Today, more than 10 million tons of organic solvents are used worldwide each year as manufacturing process aids, cleaning agents, and dispersants. The growing development of green chemistry is prompting environmentally responsible manufacturing industries to work towards the substantial diminution of the production, use, and subsequent release into the environment of contaminated water, organic solvents, and other pollutants.

Therefore, there is an interest in finding an environmentally friendly and economical process for the manufacture of poly(aryl ether sulfones) and poly(aryl ether ketones) which avoids the use of solvents and allows the easy recovery of the polymers manufactured.

SUMMARY OF THE INVENTION

Surprisingly, it has been found that a poly(aryl ether) can be advantageously produced in the presence of certain organic bases and even also in the absence of solvents. Therefore, the present invention provides a method for the manufacture of a poly(aryl ether) comprising a step (i) where:

a monomer (M1) comprising at least 2 hydroxyl groups is reacted in a reaction medium with a monomer (M2) comprising at least 2 halogen groups, and/or a monomer (M3) comprising at least one hydroxyl group and at least one halogen group is reacted in a reaction medium, in the presence of an organic base comprising C, N and H atoms, having a pKa of at least 10, and a number of proton acceptor sites [$H^+$ AS], wherein the ratio of the total number of moles of [$H^+$ AS] over the total number of moles of hydroxyl groups of the monomer (M1) and (M3) is of at least 1.05.

DETAILED DESCRIPTION

The present invention relates thus to an improved method for the manufacture of a poly(aryl ether) such as a poly(aryl ether sulfone) (PAES) or a poly(aryl ether ketone) (PAEK).

The Poly(Aryl Ether)

For the purpose of the present invention, the expression "poly(aryl ether)" is intended to denote any polymer of which more than 50 wt. % of the recurring units are recurring units ($R_{PE}$) of one or more formulae containing at least one arylene group, and at least one ether group (—O—).

The method according to the present invention is notably very well suited for the manufacture of poly(aryl ether sulfones) (PAES) or a poly(aryl ether ketones) (PAEK), or copolymers thereof.

The poly(aryl ether) obtained by the method according to the present invention has preferably a weight average molecular mass (Mw) of at least 1000, preferably at least 2000, more preferably at least 3000, still more preferably at least 4000 g/mol, yet more preferably at least 5000 g/mol, and most preferably at least 6000 g/mol. The expression "weight average molecular mass (Mw)" is hereby used according to it usual meaning and mathematically expressed as:

$$M_w = \frac{\sum M_i^2 \cdot N_i}{\sum M_i \cdot N_i}$$

wherein $M_i$ is the discrete value for the molecular weight of a polymer molecule, $N_i$ is the number of polymer molecules with molecular weight then the weight of polymer molecules having a molecular weight $M_i$ is $M_i N_i$.

The Poly(Aryl Ether Sulfone)

For the purpose of the present invention, the expressions "poly(aryl ether sulfone)" and "PAES" are intended to denote any polymer of which at least 50 wt. % of the recurring units are recurring units ($R_{PS}$) of one or more formulae containing at least one arylene group, at least one ether group (—O—) and at least one sulfone group [—S($=O)_2$—].

In the PAES as above detailed preferably more than 60%, more preferably more than 80%, still more preferably more than 90% moles of the recurring units are recurring units ($R_{PS}$), as above detailed. Still, it is generally preferred that substantially all recurring units of the PAES are recurring units ($R_{PS}$), as above detailed.

The arylene group of the PAES may be aromatic radicals comprising from 6 to 36 carbon atoms, which are optionally substituted by at least one substituent selected from the group consisting of halogen, alkyl, alkenyl, alkynyl, aryl, arylalkyl, nitro, cyano, alkoxy, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium.

The recurring units ($R_{PS}$) are advantageously recurring units of formula (A) as shown below:

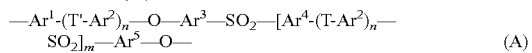

$$-Ar^1-(T'-Ar^2)_n-O-Ar^3-SO_2-[Ar^4-(T-Ar^2)_n-SO_2]_m-Ar^5-O- \quad (A)$$

wherein:
- $Ar^1, Ar^2, Ar^3, Ar^4,$ and $Ar^5$, equal to or different from each other and at each occurrence, are independently an aromatic mono- or polynuclear group;
- T and T', equal to or different from each other and at each occurrence, is independently a bond or a divalent group optionally comprising one or more than one heteroatom;
- n and m, equal to or different from each other, are independently zero or an integer of 1 to 5;

Preferably, $Ar^1, Ar^2, Ar^3, Ar^4$ and $Ar^5$ are equal or different from each other and are aromatic moieties preferably selected from the group consisting of those complying with following formulae:

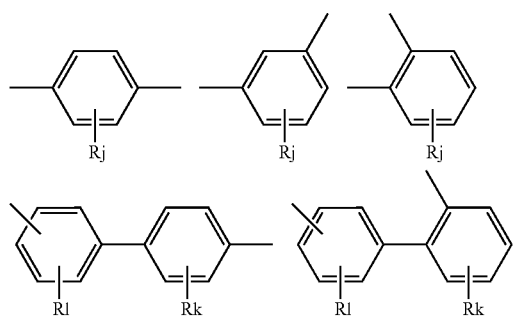

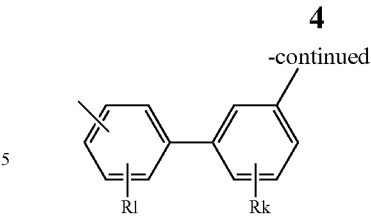

wherein each R is independently selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4.

$Ar^2$ may further be selected from the group consisting of fused benzenic rings such as naphthylenes (and in particular 2,6-naphthylene), anthrylenes (and in particular 2,6-anthrylene) and phenanthrylenes (and in particular 2,7-phenanthrylene), naphthacenylenes and pyrenylenes groups; an aromatic carbocyclic system comprising from 5 to 24 atoms, at least one of which is a heteroatom, such as pyridines, benzimidazoles, quinolines, etc. The hetero atom is often chosen from N, O, Si, P and S. It is more often chosen from N, O and S.

Preferably, T and T' of formula (A), equal to or different from each other, are selected from the group consisting of a bond, $-CH_2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R^aC=CR^b-$; where each $R^a$ and $R^b$; independently of one another, is a hydrogen or a $C_1-C_{12}$-alkyl, $C_1-C_{12}$-alkoxy, or $C_6-C_{18}$-aryl group; $-(CH_2)_n-$ and $-(CF_2)_n-$ with n=integer from 1 to 6, or an aliphatic divalent group, linear or branched, of up to 6 carbon atoms; and mixtures thereof.

Recurring units ($R_{PS}$) can be notably selected from the group consisting of those of formulae (B) to (E) herein below:

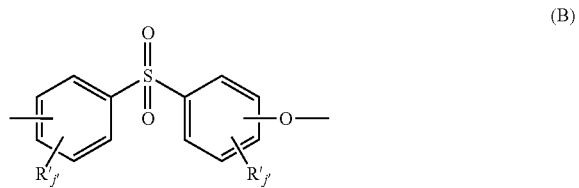

(B)

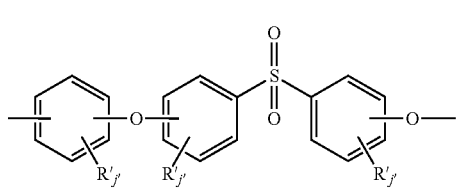

(C)

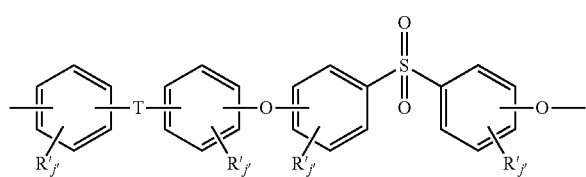

(D)

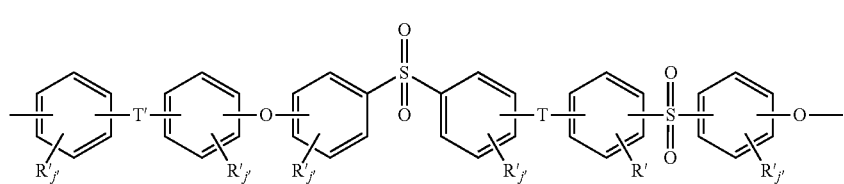

(E)

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other, is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—; where each R$^a$ and R$^b$; independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n being an integer from 1 to 6, or an aliphatic divalent group, linear or branched, of up to 6 carbon atoms; and mixtures thereof.

As will be detailed later on, the PAES may be a poly(biphenyl ether sulfone), such as a polyphenylsulfone which is especially preferred. Alternatively, the PAES may be a polyethersulfone, a polyetherethersulfone or a bisphenol A polysulfone.

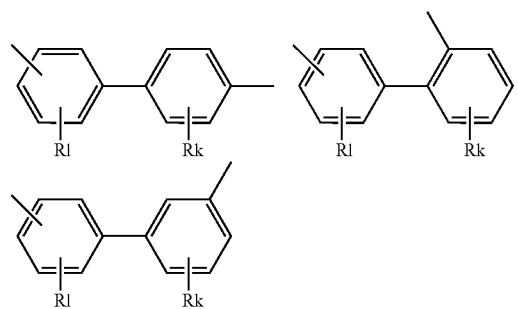

wherein R is independently selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and k and l equal or different from each other, are independently 0, 1, 2, 3 or 4.

The definitions and preferences described above for T, T', Ar$^1$, Ar$^2$, Ar$^3$, Ar$^4$, Ar$^5$, n and m equally apply here.

In certain embodiments, recurring units (R$_{PSa}$) are preferably chosen from formulaes (F) to (H) herein below:

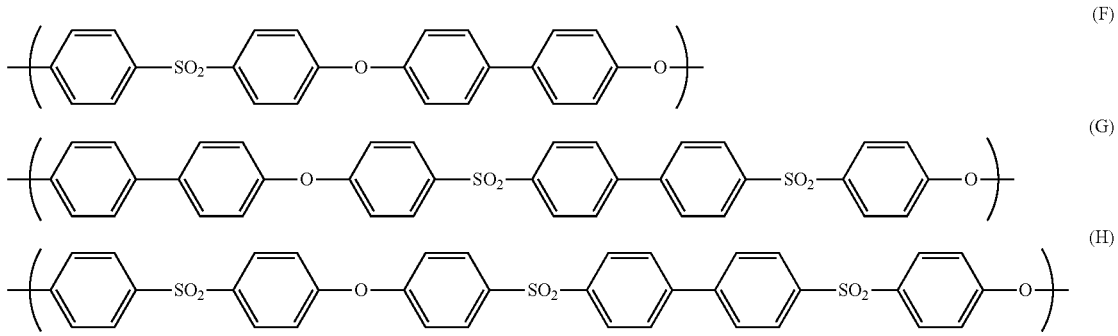

For the purpose of the present invention, a poly(biphenyl ether sulfone) is intended to denote any polymer of which at least 50 wt. % of the recurring units are recurring units (R$_{PSa}$) of one or more formulae containing at least one ether group (—O—), at least one sulfone group [—S(=O)$_2$—] and at least two groups (G*) chosen from phenylene, naphthylenes (such as 2,6-naphthylene), anthrylenes (such as 2,6-anthrylene) and phenanthrylenes (such as 2,7-phenanthrylene), naphthacenylenes and pyrenylenes, each of said groups (G*) being joined to at least one group (G*) different from itself, directly by at least one single bond and, optionally in addition, by at most one methylene group. Accordingly, groups (G*) may thus be joined together to form notably biphenylene groups such as p-biphenylene, 1,2'-binaphthylene groups, triphenylene groups such as p-triphenylene and fluorenylene groups (i.e. divalent groups derived from fluorene).

The recurring units (R$_{PSa}$) are advantageously recurring units of formula (A), as defined above, with the proviso that at least one Ar$^1$ through Ar$^5$ is an aromatic moiety preferably selected from the group consisting of those complying with following formulae:

and mixtures thereof.

Therefore, in certain preferred embodiments, the PAES is a polyphenylsulfone.

For the purpose of the present invention, a polyphenylsulfone (PPSU) is intended to denote any polymer of which more than 50 wt. % of the recurring units are recurring units (R$_{PSa}$) of formula (F). Preferably more than 75 wt. %, preferably more than 85 wt. %, preferably more than 95 wt. %, preferably more than 99 wt. % of the recurring units of the poly(biphenyl ether sulfone) are recurring units (R$_{PSa}$).

PPSU can be prepared by known methods and is notably available as RADEL® PPSU and DURADEX® D-3000 PPSU from Solvay Specialty Polymers USA, L.L.C.

In certain other preferred embodiments, the PAES is a polyethersulfone, polyetherethersulfone or a bisphenol A polysulfone.

For the purpose of the present invention, a polyethersulfone (PESU) is intended to denote any polymer of which at least 50 wt. % of the recurring units are recurring units (R$_{PSb}$) of formula (I-1):

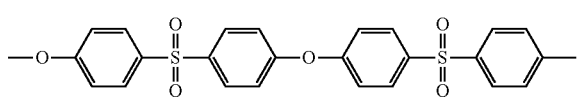

(I-1)

Preferably more than 75 wt. %, preferably more than 85 wt. %, preferably more than 95 wt. %, preferably more than 99 wt. % of the recurring units of the PESU are recurring units ($R_{PSb}$) of formula (I-1). Most preferably all the recurring units of the PESU are recurring units ($R_{PSb}$) of formula (I-1).

PESU can be prepared by known methods and is notably available as VERADEL® PESU from Solvay Specialty Polymers USA, L.L.C.

For the purpose of the present invention, a polyetherethersulfone (PEES) is intended to denote any polymer of which at least 50 wt. % of the recurring units are recurring units ($R_{PSc}$) of formula (I-2):

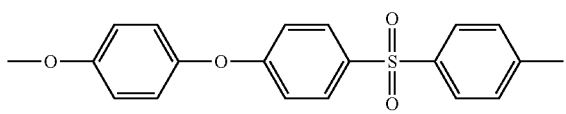

(I-2)

Preferably more than 75 wt. %, preferably more than 85 wt. %, preferably more than 95 wt. %, preferably more than 99 wt. % of the recurring units ($R_{PSc}$) of the PEES are recurring units of formula (I-2). Most preferably all the recurring units of the PEES are recurring units ($R_{PSc}$) of formula (I-2).

For the purpose of the present invention, a bisphenol A polysulfone (PSU) is intended to denote any polymer of which at least 50 wt. % of the recurring units are recurring units ($R_{PSd}$) of formula (I-3):

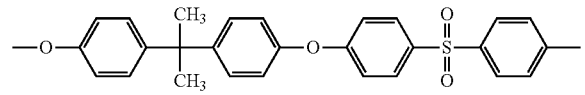

(I-3)

Preferably more than 75 wt. %, preferably more than 85 wt. %, preferably more than 95 wt. %, preferably more than 99 wt. % of the recurring units of the PSU are recurring units ($R_{PSd}$) of formula (I-3). Most preferably all the recurring units of the PSU are recurring units ($R_{PSd}$) of formula (I-3).

PSU can be prepared by known methods and is notably available as UDEL® PSU from Solvay Specialty Polymers USA, L.L.C.

According to a preferred embodiment of the invention, the PAES is selected from the group consisting of PSU, PESU and PPSU and is most preferably a PSU.

The PAES obtained by the method according to the present invention has advantageously an inherent viscosity in N-Methyl-2-pyrrolidone at 25° C. of at least 0.10, preferably at least 0.20, more preferably of at least 0.25 dl/g. It also has advantageously an inherent viscosity in DMF at 25° C. of at most 0.70, preferably at most 0.60, more preferably of at most 0.50 dl/g.

The Poly(Aryl Ether Ketone)

For the purpose of the invention, the expressions "poly (aryl ether ketone)" and "(PAEK)" are intended to denote any polymer, comprising recurring units, at least 50 wt. % of said recurring units are recurring units ($R_{PAEK}$) comprising a Ar—C(=O)—Ar' group, with Ar and Ar', equal to or different from each other, being aromatic groups. The recurring units ($R_{PAEK}$) are generally selected from the group consisting of formulae (J-A) to (J-P), herein below:

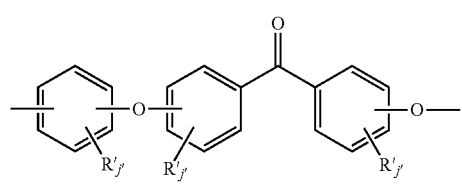

(J-A)

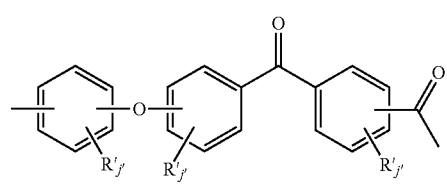

(J-B)

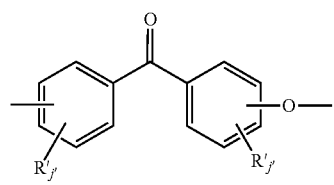

(J-C)

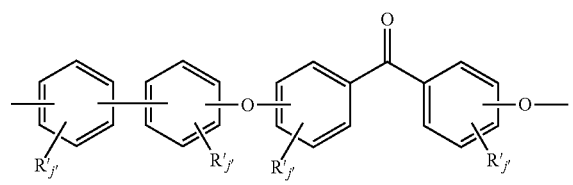

(J-D)

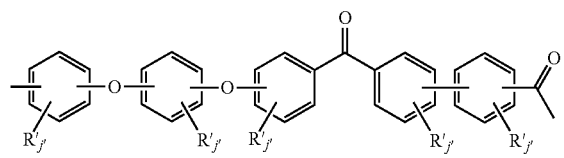

(J-E)

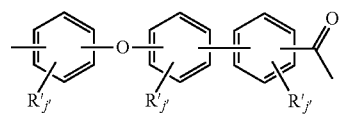

(J-F)

(J-G)
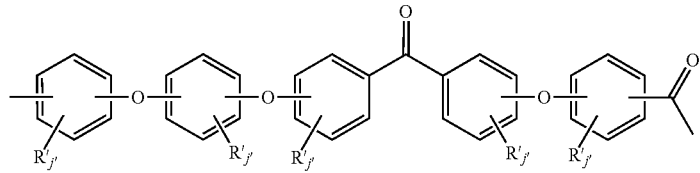
(J-H)
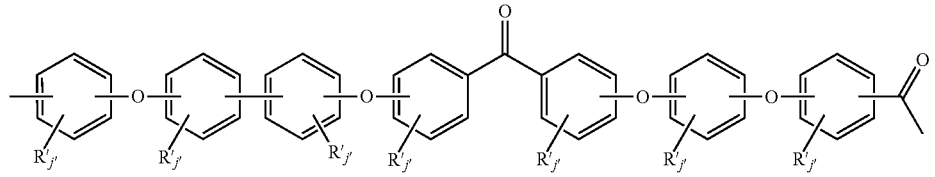
(J-I)
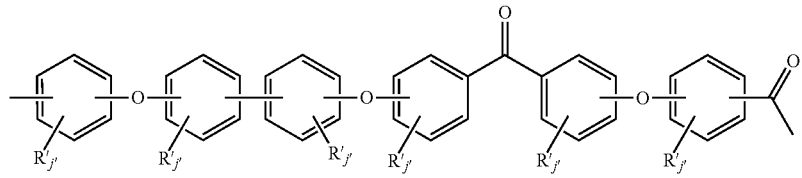
(J-J)
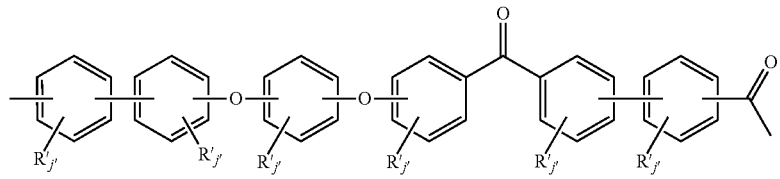
(J-K)
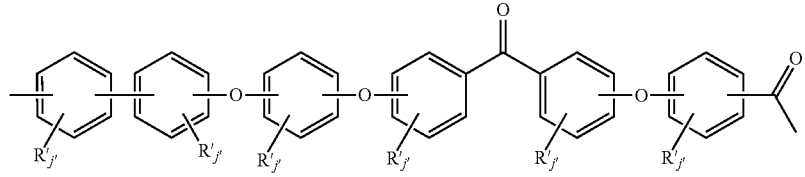
(J-L)
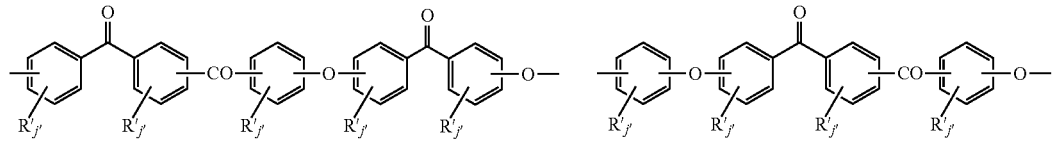
(J-M)
(J-N)
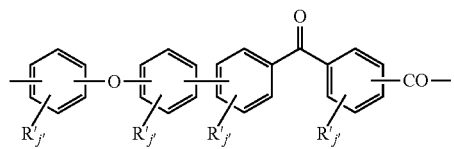
(J-O)
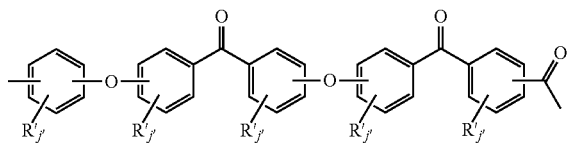
(J-P)
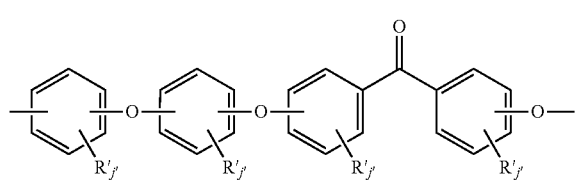

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is preferably at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

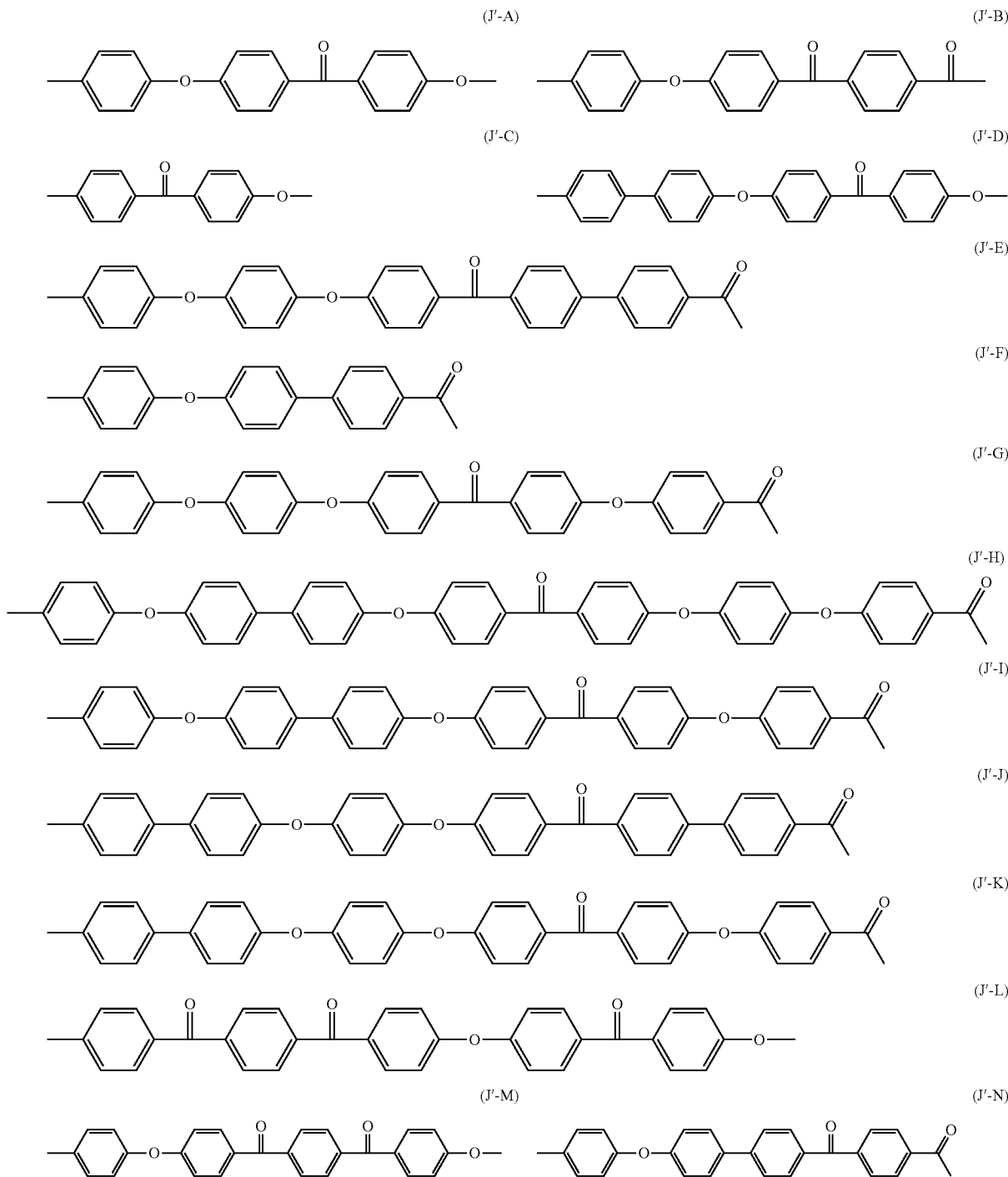

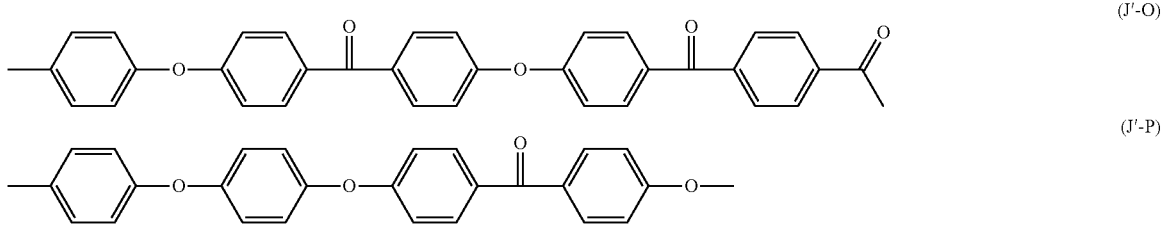

(J'-O)

(J'-P)

Still more preferably, (R$_{PAEK}$) are chosen from:

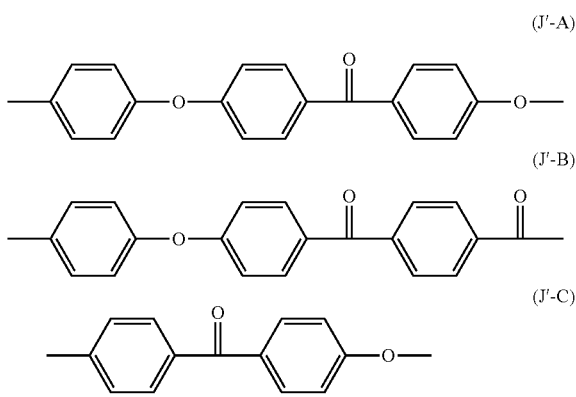

(J'-A)

(J'-B)

(J'-C)

In the PAEK, as detailed above, preferably more than 60 wt. %, more preferably more than 80 wt. %, and still more preferably more than 90 wt. % of the recurring units are recurring units (R$_{PAEK}$), as above detailed.

The PAEK may be notably a homopolymer, a random, alternate or block copolymer. When the PAEK is a copolymer, it may notably contain (i) recurring units (R$_{PAEK}$) of at least two different formulae chosen from formulae (J-A) to (J-O), or (ii) recurring units (R$_{PAEK}$) of one or more formulae (J-A) to (J-O) and recurring units (R*$_{PAEK}$) different from recurring units (R$_{PAEK}$).

As will be detailed later on, the PAEK may be a polyetheretherketone polymer [PEEK polymer, herein after]. Alternatively, the PAEK may be a polyetherketoneketone polymer [(PEKK) polymer, herein after], polyetherketone polymer [PEK polymer, hereinafter] or a polyetheretherketone-polyetherketoneketone polymer [PEEK-PEK polymer, herein after].

For the purpose of the present invention, the term "PEEK polymer" is intended to denote any polymer of which at least 50 wt. % of the recurring units are recurring units (R$_{PAEK}$) of formula J'-A.

Preferably more than 75 wt. %, preferably more than 85 wt. %, preferably more than 95 wt. %, preferably more than 99 wt. % of the recurring units of the PEEK polymer are recurring units of formula J'-A. Most preferably all the recurring units of the PEEK polymer are recurring units of formula J'-A.

For the purpose of the present invention, the term "PEKK polymer" is intended to denote any polymer of which at least 50 wt. % of the recurring units are recurring units (R$_{PAEK}$) of formula J'-B.

Preferably more than 75 wt. %, preferably more than 85 wt. %, preferably more than 95 wt. %, preferably more than 99 wt. % of the recurring units of the PEKK polymer are recurring units of formula J'-B. Most preferably all the recurring units of the PEKK polymer are recurring units of formula J'-B.

For the purpose of the present invention, the term "PEK polymer" is intended to denote any polymer of which at least 50 wt. % of the recurring units are recurring units (R$_{PAEK}$) of formula J'-C.

Preferably more than 75 wt. %, preferably more than 85 wt. %, preferably more than 95 wt. %, preferably more than 99 wt. % of the recurring units of the PEK polymer are recurring units of formula J'-C. Most preferably all the recurring units of the PEK polymer are recurring units of formula J'-C.

The PAEK can be prepared by any method known in the art for the manufacture of poly(aryl ether ketone)s and is commercially available as KETASPIRE® polyetheretherketone from Solvay Specialty Polymers USA, LLC.

The PAEK obtained by the method according to the present invention has advantageously an inherent viscosity in concentrated sulphuric acid (96%) at 25° C. of at least 0.30, preferably at least 0.40, more preferably of at least 0.50 dl/g. It also has advantageously an inherent viscosity in concentrated sulphuric acid (96%) at 25° C. of at most 2.20, preferably at most 2.10, more preferably of at most 2.0 dl/g.

The Monomers (M1), (M2) and (M3)

In the step (i) of the method according to the present invention, a monomer (M1) comprising at least 2 hydroxyl groups is reacted in a reaction medium with a monomer (M2) comprising at least 2 halogen groups, in the presence of an organic base comprising C, N and H atoms, having a pKa of at least 10, and a number of proton acceptor sites [H$^+$ AS], wherein the ratio of the total number of moles of [H$^+$ AS] over the total number of moles of hydroxyl groups of the monomer (M1) and (M3) is of at least 1.05.

Among examples of monomers (M1) comprising at least 2 hydroxyl groups, mention can notably be made of isosorbide (1), isomannide (2), isoidide (3), and of compounds of formulas (4):

(1)

(2)

-continued

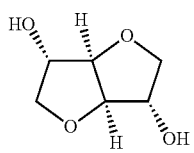
(3)

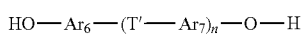
(4)

wherein:
n is zero or an integer of 1 to 5;
each of $Ar_6$ and $Ar_7$, equal to or different from each other and at each occurrence, is an aromatic moiety selected from the group consisting of the formula:

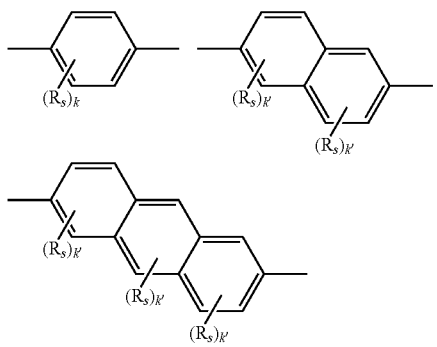

wherein:
each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
k is zero or an integer of 1 to 4; k' is zero or an integer of 1 to 3;
T' is a bond or a divalent group optionally comprising one or more than one heteroatom; preferably T is selected from the group consisting of a bond, —SO$_2$—, —CH$_2$—, —C(=O)—, —C(CH$_3$)$_2$—, —C(CF$_3$)$_2$—, and —C(=CCl$_2$)—.

Preferably, monomers (M1) comprise 2 hydroxyl groups.

In particular, monomers (M1) may be selected from the group consisting of isosorbide, hydroquinone(s), biphenol(s), dihydroxynaphthalene(s), bis(hydroxyphenyl)ketone(s), bis(hydroxyphenyl)sulfone(s), dihydroxyphenylphenylketone(s), and dihydroxyphenylphenylsulfone(s).

Among preferred monomers (M1), suitable for being used in the process of the present invention, mention may be notably made of the following molecules:

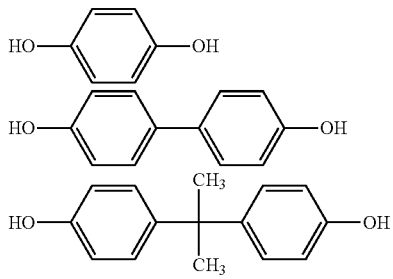

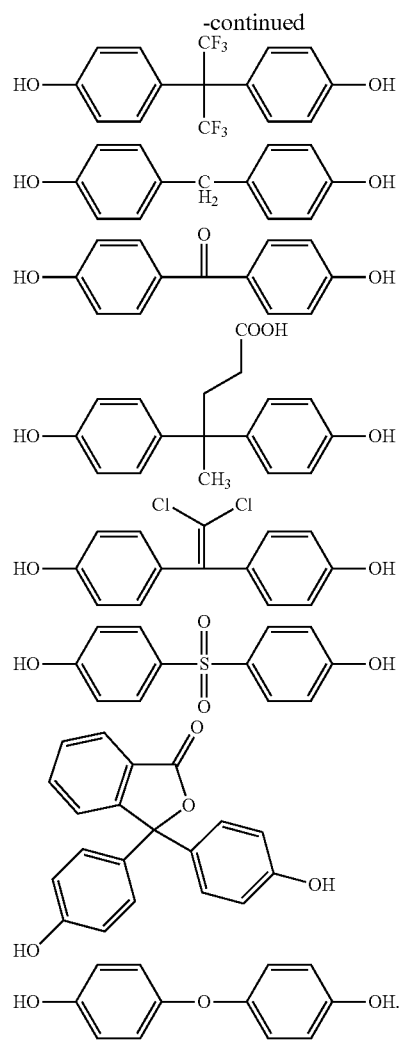

More preferably, the monomer (M1) is selected from the group consisting of 2,2-bis(4-hydroxyphenyl)propane (commonly known as Bisphenol A), and bis(4-hydroxyphenyl)sulfone (Bisphenol S). Most preferably, the monomer (M1) is Bisphenol A.

The monomers (M2) comprising at least 2 halogen groups are preferably complying with formulae (K-1) to (K-3), as shown below:

(K-1)

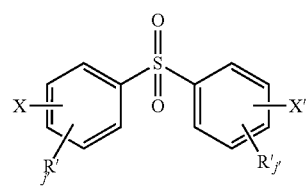

(K-2)

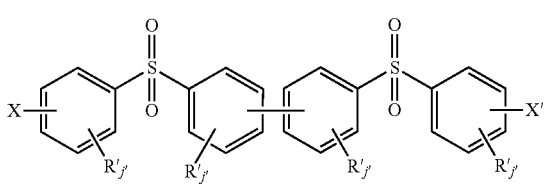

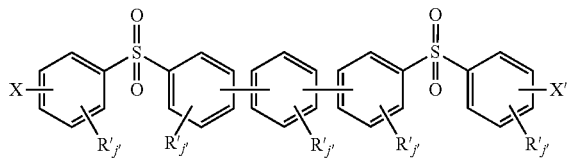

(K-3)

wherein:
each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

X and X', equal to or different from each other, are independently a halogen atom, preferably Cl or F.

More preferred monomers (M2) are those complying with following formulae shown below:

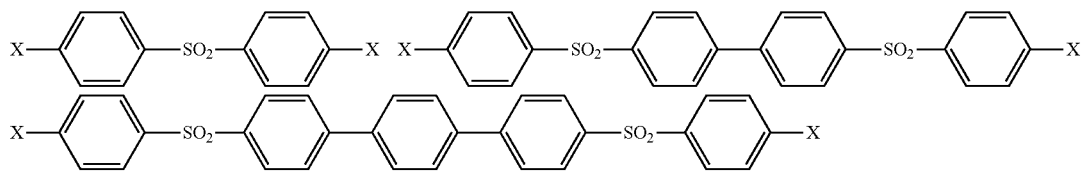

wherein X is as defined above, X is preferably Cl or F.

Preferably, monomers (M2) comprise 2 halogen groups.

Non limitative examples of monomers (M2) are 4,4'-dichlorodiphenyl sulfone (DCDPS), 4,4'-difluorodiphenyl sulfone (DFDPS), 4,4'-dibromodiphenyl sulfone (DBDPS), 4,4'-diiododiphenyl sulfone (DIDPS), bis(2-methyl-4-chlorophenyl)sulfone, bis(2,5-dimethyl-4-chlorophenyl)sulfone, p-chlorophenyl p-bromophenyl sulfone, bis(3-isopropyl-4-iodophenyl)sulfone, bis(2,5-dipropyl-4-chlorophenyl)sulfone, bis(2-butyl-4-fluorophenyl)sulfone, and bis(2,3,5,6-tetramethyl-4-chlorophenyl)sulfone.

The monomer (M2) is preferably selected from the group consisting of 4,4'-difluorodiphenyl sulfone (DFDPS) and 4,4'-dichlorodiphenyl sulfone (DCDPS).

The molar ratio of the total number of monomers (M1) over the total number of monomers (M2) is preferably between 0.5 and 1.5, preferentially between 0.8 and 1.2, more preferentially between 0.98 and 1.02 and even more preferentially equal to 1.

Alternatively, a monomer (M3) comprising at least one hydroxyl group and at least one halogen group may be reacted in the reaction medium, in the method according to the present invention. The monomer (M3) can be used alone or in combination with a mixture of monomer (M1) and monomer (M2).

Preferably, monomers (M3) comprise one hydroxyl group and one halogen group.

Non limitative examples of monomers (M3) comprising at least one hydroxyl group and at least one halogen group are 4-chloro-4'-hydroxydiphenylsulfone and 4-fluoro-4'-hydroxybenzophenone.

The Organic Base

In the method according to the present invention, use is made of an organic base comprising C, N and H atoms, having a pKa of at least 10, preferably of at least 11. The pKa is a widely used measure in the art quantitatively measuring the strength of acids and bases and is the result of the logarithm (base 10) of the acid dissociation constant Ka.

The Applicant has surprisingly discovered that the use of an organic base has numerous advantages over the inorganic bases typically used in the manufacture of poly(aryl ether sulfone)s or poly(aryl ether ketone)s. The organic base typically presents a good miscibility both in neutral and protonated form in the reaction medium, reducing the viscosity of the reaction medium and therefore contributing to the overall good yields in the polymerization reaction. In addition, if necessary, the salts of the organic base are usually easily removed at the end of step (i) or later in the process according to the present invention by evaporation or filtration of the reaction medium.

In particular, the organic base is selected from the group consisting of methylamine, dimethylamine, dimethyldiethylamine, dimethyl-sec-butylamine, tri-n-propylamine, tri-isopropylamine, 1-methyl-2-n-butyl-Δ2-pyrroline, 1-ethyl-2-methyl-Δ2-pyrroline, 1-n-butyl-2-methyl-Δ2-pyrroline, 1,2-dimethyl-Δ2-tetrahydropyridine, 1-n-propylpiperidine, triethylamine, dimethyl-n-butylamine, dimethyl-isopropylamine, dimethyl-t-butylamine, tri-n-butylamine, 1-n-propylpiperidine, 1,2-dimethylpyrrolidine, 1-methyl-2-n-butylpyrrolidine, 1-ethyl-2-methylpyrrolidine, 1-n-butyl-2-methylpyrrolidine, 1-ethyl-2-methylpyrrolidine, 1,2-dimethylpiperidine, 1-ethyl-2-methyl-Δ2-tetrahydropyridine, 1,5-diazabicyclo[4.3.0]non-5-ene (DBN), 1,8-diazabicyclo[5.4.0]undec-7-ene (DBU), 1,4-diazabicyclo[2.2.2]octane, 1,1,3,3-tetramethylguanidine, lysine, arginine, and guanidine. Preferably, the organic base is selected from the group consisting of trisiopropylamine, triethylamine, 1,5-diazabicyclo[4.3.0]non-5-ene (DBN), 1,8-diazabicyclo[5.4.0]undec-7-ene (DBU), 1,4-diazabicyclo[2.2.2]octane, 1,1,3,3-tetramethylguanidine, guanidine, and mixtures thereof. More preferably, the organic base is 1,8-diazabicyclo[5.4.0]undec-7-ene (DBU) or triethylamine.

Organic bases are defined as having at least one proton acceptor sites [H$^+$ AS]. For example, DBU and triethylamine have both one proton acceptor site [H$^+$ AS].

The Applicant has surprisingly found that the use of an optimum amount of organic base allows reducing significantly the reaction times of the method of the present invention while avoiding using excessive amounts of alkali metal carbonate which leads to higher costs and more difficult polymer purifications. Therefore, the amount of organic base, and more specifically the ratio of the total number of moles of [H$^+$ AS] over the total number of moles of hydroxyl groups of the monomer (M1), is a key factor in the method according to the present invention. In the method according to the present invention, the ratio of the total number of moles of [H$^+$ AS] over the total number of moles of hydroxyl groups of the monomer (M1) and (M3) is advantageously of at least 1.05, preferably of at least 1.10, more preferably of at least 1.14, still more preferably of at least 1.18, even more preferably of at least 1.20, yet more preferably of at least 1.25. Also, the ratio of the total number of moles of [H⁺ AS] over the total number of moles of hydroxyl groups of the monomer (M1) and (M3) is advantageously of at most 5, preferably of at most 4, more preferably of at most 3, still more preferably of at most 2, even more preferably of at most 1.9, yet more preferably of at most 1.8. Excellent results were obtained when said ratio was of at least 1.20 and at most 1.80.

The method according to the present invention is preferably carried out in the presence of a mixture of the organic base and an inorganic base. In a first embodiment, the above mentioned step (i) is preferably carried out in the presence of a mixture of the organic base with an inorganic base. When an inorganic base is added to the organic base, the molar content of the [H+ AS] coming from the organic base among the total of the [H+ AS] coming from both the organic base and inorganic base is preferentially between 1 mol. % and 99 mol. %, more preferentially between 10 mol. % and 90 mol. %, even more preferentially between 20 mol. % and 80 mol. %. Alternatively, in a second embodiment, the step (i) is preferably followed by an optional step (ii) where an inorganic base is added to the reaction medium.

Suitable inorganic bases may be selected from carbonates, and in particular from the group consisting of lithium carbonate, sodium carbonate, sodium hydrogen carbonate, potassium carbonate, potassium hydrogen carbonate, magnesium carbonate, calcium carbonate, rubidium carbonate, cesium carbonate and mixtures thereof. Sodium carbonate and potassium carbonate are preferred, alone or in mixtures. Other suitable inorganic bases may be selected from metal hydroxides, particularly alkali metal hydroxides and in particular from the group consisting of lithium hydroxide, sodium hydroxide and potassium hydroxide, rubidium hydroxide, cesium hydroxide, and mixtures thereof. Preferred inorganic bases are selected from the group consisting of sodium carbonate, potassium carbonate, calcium carbonate, lithium hydroxide, sodium hydroxide, potassium hydroxide, and mixtures thereof.

The quantities of the inorganic base used in the method of the present invention are substantially dependent on the quantity of monomers (M1) and (M2) to be reacted. When inorganic bases are used in the method according to the present invention, the ratio of the total number of moles of [H⁺ AS], including those coming from the organic base and those coming from the inorganic base, over the total number of moles of hydroxyl groups of the monomer (M1) and (M3) is advantageously of at least 1.05, preferably of at least 1.10, more preferably of at least 1.14, still more preferably of at least 1.18, even more preferably of at least 1.20, yet more preferably of at least 1.25. Also, this ratio is advantageously of at most 5, preferably of at most 4, more preferably of at most 3, still more preferably of at most 2, even more preferably of at most 1.9, yet more preferably of at most 1.8.

The use of an inorganic base, and in particular an alkali metal carbonate having an average particle size of less than about 100 μm, preferably of less than about 50 μm is particularly advantageous. The use of an alkali metal carbonate having such a particle size permits the synthesis of the polymers with a relatively lower reaction temperature with shorter reaction times.

The method according to the present invention may advantageously be carried out in the absence of solvent. In particular, the step (i) is preferably carried out in the absence of solvent. The absence of solvents renders the method more economical while also easing the recovery of the polymer.

However, a solvent may optionally be used in the method according to the present invention. If present, the solvent is preferably selected among polar aprotic solvents. As polar aprotic solvents, sulphur containing solvents known and generically described in the art as dialkyl sulfoxides and dialkylsulfones wherein the alkyl groups may contain from 1 to 8 carbon atoms, including cyclic alkyliden analogs thereof, can be mentioned. Specifically, among the sulphur-containing solvents that may be suitable for the purposes of this invention are dimethylsulfoxide, dimethylsulfone, diphenylsulfone, diethylsulfoxide, diethylsulfone, diisopropylsulfone, tetrahydrothiophene-1,1-dioxide (commonly called tetramethylene sulfone or sulfolane) and tetrahydrothiophene-1-monoxide and mixtures thereof. Good results have been obtained with sulfolane. Nitrogen-containing polar aprotic solvents, including N,N-dimethylacetamide, N,N-dimethylformamide and N-methyl pyrrolidone (NMP), N-methylcaprolactam and the like have been disclosed in the art for use in these processes, and may also be found useful in the practice of this invention. Two or more polar aprotic solvents can optionally also be used in a mixture. Mixtures of polar aprotic solvent with non-polar, aliphatic, cycloaliphatic or preferably aromatic solvents, e.g., toluene, xylene(s), chlorobenzene or o-dichlorobenzene can also be used.

Although the temperature at which step (i) is conducted can vary over a considerable range, generally it may be carried out at a temperature of at least 150° C., preferably at least 155° C., more preferably at least 160° C., still more preferably at least 165° C., most preferably at least 170° C. The step (i) may also be carried out at a temperature of at most 400° C., preferably at most 300° C., more preferably at most 280° C., still more preferably at most 250° C., most preferably at most 240° C. In certain cases, good results were obtained when said temperature was of at least 170° C. and at most 240° C. In other cases, excellent results were obtained when said temperature was of at least 200° C. and at most 230° C. The choice of the reaction temperature in step (i) should be of course adapted to the solvent (or solvent mixture) used—if any—, e.g., in dimethyl sulfoxide (DMSO) or mixtures with DMSO (e.g., DMSO/toluene), a temperature range of 130 to 160° C. is preferred, whereas in N-methylpyrrolidone (NMP) or mixtures with NMP the reaction is preferably performed at 170 to 200° C.

The reaction time of step (i) can vary widely depending in part on the reaction temperature, the nature of the reagents used and the presence of solvents, but generally will be within the range of about 1 minute to about 24 hours, preferably about 5 minutes to about 8 hours. In step (i), each monomer and base can be added at any time of the process, at the beginning, in the middle or at the end of the polymerization.

The pressure applied throughout the step (i) should be sufficient to maintain the reactants substantially in the liquid phase in the reaction medium. Typically, a pressure ranging from 1 atm to 10 atm can be used. In certain embodiments, a pressure of about 1-2 atm is preferably used. In certain other embodiments of the present invention, a pressure of about 2-10 atm is preferably used, depending on the nature of the reactants and the presence of solvents.

At the end of the step (i), the concentration of the poly(aryl ether) may vary greatly, depending on the absence or presence of any solvent. The poly(aryl ether) may be thus present in a concentration of at least 5 wt. %, preferably at least 15 wt. % and more preferably at least 30 wt. %. The poly(aryl ether) may also be present in a concentration of at most 100 wt. %, or at most 80 wt. %, based on the total weight of the reaction medium.

In the method according to the present invention, the step (i) and optional step (ii) may be followed by a step (iii) where the poly(aryl ether) obtained at the end of step (i) (or (ii)) is end-capped by any end-capping agent known in the art.

In the method according to the present invention, the step (i) and optional steps (ii) and (iii) may be followed by a step (iv) where the obtained poly(aryl ether) is recovered from the reaction medium. The polymer can be worked up and isolated by the method known from polymer chemistry, and in particular by numerous suitable methods available to the expert familiar with poly(aryl ether) chemistry, especially PAES and PAEK chemistry. The polymers produced by the method according to the present invention can be separated from the reaction mixture by conventional procedures such as by filtration, followed by washing the recovered solids with water, or by dilution of the reaction mixture with suitable solvent and/or water followed by filtration and water washing of the recovered solids. The poly(aryl ether) may in particular be recovered from the reaction medium by filtration. Interestingly, the poly(aryl ether) can also be separated from the side products of step (i) by distillation, where the side products of step (i) (i.e. salts of the organic amine) are easily distilled off the reaction medium. To this aim, a pressure ranging from 0.1 mbar to 1 atm can be applied to the reaction medium at the end of step (i) (and optionally (ii)) to perform said distillation.

EXAMPLES

The Tg at the mid-point of the polymers was determined by Differential Scanning calorimetry (DSC) using a TA Instrument DSC Q20 under nitrogen at a heating speed of 20° C./min, according to the ASTM D3418.

The number average molecular weight (Mn) and weight average molecular weight (Mw) were measured by Gel Permeation Chromatography (GPC) in dichloromethane as a mobile phase. Two 5 micron mixed D Size Exclusion Chromatography columns with guard from Agilent Technologies were used for separation. An ultraviolet detector of 270 nm was used to obtain the chromatogram. A flow rate of 1.1 mL/min and injection volume of 10 μL of a 0.2% w/v solution in the mobile phase was selected. The calibration was performed using 10 narrow standards of polystyrene obtained from Agilent Technologies (with a peak molecular weight ranging from 580 to 371000 g/mol). The acquisition of the data, integration of the peaks and calculation was carried out using the Empower Pro GPC software manufactured by Waters. The peak integration start and end points were manually determined from significant difference on global baseline.

Comparative Example 1 (CE1)

Polysulfone Synthesized from a Stoichiometric Amount of Organic Base and Hydroxyls and with 1.5 mol.-% Excess of DCDPS Versus Bisphenol A at 210° C.

In a 500 mL 4-necks reactor equipped with a condenser and a trap were introduced first 57.06 g (0.25 mol) of bisphenol A, 76.16 g (0.5 mol) of 1,8-Diazabicyclo[5.4.0]undec-7-ene (DBU) and 258 g of sulfolane as a solvent. After introduction of a nitrogen blanket and bubbling in the reaction mixture, the reaction mixture was stirred and heated to 70° C. up to dissolution of bisphenol A. The reaction mixture was cooled down to 44° C. and then 72.87 g (0.25375 mol-1.5 mol.-% excess versus bisphenol A) of 4,4'-dichlorodiphenyl sulfone (DCDPS) was added. The reaction mixture was heated up to 210° C. within 4 hours and maintained at 210° C. for 60 min. The yellowish transparent solution has a low viscosity. Upon cooling, the viscosity increases but the solution remains completely transparent. The GPC analysis of the polymer solution gives Mn=1689 g/mol and Mw=2485 g/mol. The polysulfone was recovered by coagulation in water followed by 3 washes with hot water and drying under vacuum overnight at 80° C. The GPC analysis of the polymer powder gives Mn=1715 g/mol and Mw=2514 g/mol.

Comparative Example 2 (CE2)

Polysulfone Synthesized from a Stoichiometric Amount of Organic Base and Hydroxyls and with 6 mol.-% Excess of DCDPS Versus Bisphenol A, without any Solvent at 210° C.

In a 250 mL 4-necks reactor equipped with a condenser and a trap were introduced first 34.24 g (0.15 mol) of bisphenol A and 45.71 g (0.3 mol) of DBU. After introduction of a nitrogen blanket and bubbling in the reaction mixture, the reaction mixture was stirred and heated to 74° C. and then 45.67 g (0.159 mol-6 mol.-% excess) of 4,4'-dichlorodiphenylsulfone was added. The reaction mixture was then heated up to 210° C. within 2 hours and let react for 60 min. The transparent yellowish polymer melt has a low viscosity. Upon cooling, the viscosity increases quickly up to be a transparent strong yellowish solid. The GPC analysis of the solid gives Mn=1899 g/mol and Mw=2967 g/mol. After dissolution in NMP to get a 10 wt.-% polymer solution, coagulation in water followed by 3 washes with hot water and drying under vacuum overnight at 80° C., the GPC analysis of the polymer powder gives Mn=1914 g/mol and Mw=2955 g/mol.

Comparative Example 3 (CE3)

Polysulfone Synthesized from a Stoichiometric Amount of Organic Base and Hydroxyls and with a Stoichiometric Content of DCDPS and Bisphenol A, without any Solvent at 210° C.

In a 250 mL 4-necks reactor equipped with a condenser and a trap were introduced first 34.24 g (0.15 mol) of bisphenol A, 43.08 g (0.15 mol) of 4,4'-dichlorodiphenylsulfone and 46.14 g (0.3 mol) of DBU. After introduction of a nitrogen blanket in the reaction mixture, the reaction mixture was stirred and heated to 210° C. within 1 hour and let react for 60 min. The yellowish-orange transparent polymer melt has a higher viscosity than in example 2. Upon cooling, the viscosity increases quickly up to be a transparent strong yellowish-orange solid. The GPC analysis of the solid gives Mn=2012 g/mol and Mw=3351 g/mol.

Example 1 (E1)

Polysulfone Synthesized from an Excess of Organic Base (25 mol.-% More than the Hydroxyls) and with a Stoichiometric Content of DCDPS and Bisphenol A, without any Solvent In a 250 mL 4-necks reactor equipped with a condenser and a trap were introduced first 34.24 g (0.15 mol) of bisphenol A, 43.08 g (0.15 mol) of 4,4'-dichlorodiphenylsulfone and 57.67 g (0.379 mol) of DBU. After introduction of a nitrogen blanket in the reaction mixture, the reaction mixture was stirred and heated to 210° C. within 1 hour and let react for 60 min (E1A) and for additional 3 hours (E1B). The yellowish-orange transparent polymer melt has a higher viscosity than in reference example 3. Upon cooling, the viscosity increases quickly up to be a transparent strong yellowish-orange solid. The GPC analysis of the solid E1A (after 1 hour reaction at 210° C.) gives Mn=2832 g/mol and Mw=5149 g/mol and the GPC analysis of the solid E1B (after 4 hours reaction at 210° C.) gives Mn=3607 g/mol and Mw=8691 g/mol.

It appears that the excess of organic base DBU allows increasing the molecular weight after a similar time of reaction at a similar reaction temperature compared to a stoichiometric amount of organic base.

Example 2 (E2)

Polysulfone Synthesized from an Excess of Organic Base (50 mol.-% More than the Hydroxyls) and with a Stoichiometric Content of DCDPS and Bisphenol A, without any Solvent at 230° C.

In a 250 mL 4-necks reactor equipped with a condenser and a trap were introduced first 34.24 g (0.15 mol) of bisphenol A, 43.08 g (0.15 mol) of 4,4'-dichlorodiphenyl-sulfone and 69.24 g (0.455 mol) of DBU. After introduction of a nitrogen blanket in the reaction mixture, the reaction mixture was stirred and heated to 230° C. within 1 hour and let react for 60 min. Upon cooling, the viscosity increases quickly up to be a transparent strong redish solid. The GPC analysis of the solid polymer (after 1 hour reaction at 230° C.) gives Mn=3835 g/mol and Mw=6391 g/mol.

It appears that the increase in temperature and excess of DBU allows increasing the molecular weight.

Example 3 (E3)

Polysulfone Synthesized from a Mixture of Organic Base and Inorganic Base in Excess (25 mol.-% More than the Hydroxyls) and with a Stoichiometric Content of DCDPS and Bisphenol A, without any Solvent at 210° C.

In a 250 mL 4-necks reactor equipped with a condenser and a trap were introduced first 34.24 g (0.15 mol) of bisphenol A, 43.08 g (0.15 mol) of 4,4'-dichlorodiphenyl-sulfone, 5.18 g (0.038 mol) of potassium carbonate and 46.13 g (0.3 mol) of DBU. After introduction of a nitrogen blanket in the reaction mixture, the reaction mixture was stirred and heated to 210° C. within 2 hours and let react for 60 min (E3A) and let react for additional 3 hours (E3B). Upon cooling, the viscosity increases quickly up to be a transparent light tan solid. The GPC analysis of the solid E3A (after 1 hour reaction at 210° C.) gives Mn=2143 g/mol and Mw=3646 g/mol and the GPC analysis of the solid E3B (after 4 hours reaction at 210° C.) gives Mn=3128 g/mol and Mw=6062 g/mol. E3C was obtained by further heating the reaction medium under nitrogen without any stirring for an additional 2 hour at 250° C. and the GPC analysis gives Mn=4993 g/mol and Mw=8439 g/mol. The increase in temperature increases the molecular weight of the polymer prepared with a mixture of organic base and inorganic base.

Example 4 (E4)

Polyphenylene Sulfone (PPSU) Synthesized from an Excess of Organic Base (27 mol.-% More than the Hydroxyls) and with a Stoichiometric Content of DCDPS and 4,4'-Biphenol, without any Solvent In a 250 mL 4-necks reactor equipped with a condenser and a trap were introduced first 28.11 g (0.151 mol) of 4,4'-biphenol, 43.22 g (0.151 mol) of 4,4'-dichlorodiphenyl-sulfone and 58.21 g (0.382 mol) of DBU. After introduction of a nitrogen blanket in the reaction mixture, the reaction mixture was stirred and heated to 210° C. within 1 hour and let react for 60 min (E4A) and for additional 3 hours (E4B). The yellowish-orange transparent polymer melt has a good viscosity. Upon cooling, the viscosity increases quickly up to be a transparent strong yellowish-orange solid. The GPC analysis of the solid E4A (after 1 hour reaction at 210° C.) gives Mn=4,755 g/mol and Mw=9,200 g/mol and the GPC analysis of the solid E4B (after 4 hours reaction at 210° C.) gives Mn=4,177 g/mol and Mw=11,499 g/mol.

TABLE 1

Results of the polymerizations

| | CE1 | CE2 | CE3 | E1A | E1B | E2 | E3A | E3B | E4A | E4B |
|---|---|---|---|---|---|---|---|---|---|---|
| DCDPS (mol) | 0.25375 | 0.159 | 0.15 | 0.15 | 0.15 | 0.15 | 0.15 | 0.15 | 0.15 | 0.15 |
| Bisphenol A (mol) | 0.25 | 0.15 | 0.15 | 0.15 | 0.15 | 0.15 | 0.15 | 0.15 | | |
| 4,4'-biphenol | | | | | | | | | 0.15 | 0.15 |
| DBU | 0.5 | 0.3 | 0.3 | 0.379 | 0.379 | 0.455 | 0.3 | 0.3 | 0.382 | 0.382 |
| solvent | sulfolane | — | — | — | — | — | — | — | — | — |
| Inorganic base | — | — | — | — | — | — | $K_2CO_3$ - 0.038 mol | $K_2CO_3$ - 0.038 mol | — | — |
| Temp (° C.) | 210 | 210 | 210 | 210 | 210 | 230 | 210 | 210 | 210 | 210 |
| Heating time (hrs) | 4 | 2 | 1 | 1 | 1 | 1 | 2 | 2 | 1 | 1 |
| Reaction time (min) | 60 | 60 | 60 | 60 | 240 | 60 | 60 | 240 | 60 | 240 |
| ratio [$H^+$ AS]/OH | 1 | 1 | 1 | 1.26 | 1.26 | 1.52 | 1.25 | 1.25 | 1.27 | 1.27 |
| Mn (g/mol) | 1715 | 1914 | 2012 | 2832 | 3607 | 3835 | 2143 | 3128 | 4755 | 4177 |
| Mw (g/mol) | 2514 | 2955 | 3351 | 5149 | 8691 | 6391 | 3646 | 6062 | 9200 | 11499 |

The comparison of the results obtained with E1A and CE3 show the critical importance of the ratio of the total number of moles of [H$^+$ AS] over the total number of moles of hydroxyl groups of the monomer (M1). When the ratio is of 1 (example CE3), the weight average molecular weight Mw is of about 3300 g/mol, while when the ratio is of at least 1.05 (1.26 for E1A), higher molecular weight polymers are obtained (about 5100 g/mol), all other conditions being equal.

In addition, the comparison of the results obtained with E1A and E1B show also the importance of the reaction time (60 min vs. 240 min).

Now, changing the above-mentioned ratio from 1.26 to 1.52 also helped in preparing higher molecular weight polymers (see E2 vs. E1A).

The presence of an inorganic base such as potassium carbonate was also beneficial to the polymerization reaction (see E3A and E3B vs. E1A).

Examples E4A and E4B show that the PPSU obtained had a higher molecular weight than the polysulfone prepared under similar conditions (i.e., Examples E1A and E1B, respectively).

The improved method according to the present invention allows an environmentally friendly and economical manufacture of poly(aryl ethers) which avoids the use of solvents and allows the easy recovery of the polymers manufactured.

Should the disclosure of any patents, patent applications, and publications which are incorporated herein by reference conflict with the description of the present application to the extent that it may render a term unclear, the present description shall take precedence.

The invention claimed is:

1. A method for making a poly(aryl ether) comprising a step (i), which comprises:
    reacting a monomer (M1) comprising at least 2 hydroxyl groups in a reaction medium with a monomer (M2) comprising at least 2 halogen groups, and/or
    reacting a monomer (M3) comprising at least one hydroxyl group and at least one halogen group in a reaction medium,
in the presence of an organic base comprising C, N and H atoms, having a pKa of at least 10, and a number of proton acceptor sites [H$^+$ AS], wherein the ratio of the total number of moles of [H$^+$ AS] over the total number of moles of hydroxyl groups of the monomer (M1) and (M3) is of at least 1.20.

2. The method according to claim 1, wherein the poly(aryl ether) is a poly(aryl ether sulfone) or a poly(aryl ether ketone).

3. The method according to claim 2, wherein the step (i) is followed by an optional step (ii) where an inorganic base is added to the reaction medium.

4. The method according to claim 3, wherein the inorganic base is selected from the group consisting of sodium carbonate, potassium carbonate, calcium carbonate, lithium hydroxide, sodium hydroxide, potassium hydroxide, and mixtures thereof.

5. The method according to claim 3, wherein the step (i) and optional step (ii) are followed by a step (iii) where the poly(aryl ether sulfone) or poly(aryl ether ketone) is recovered from the reaction medium.

6. The method according to claim 5, wherein the poly(aryl ether sulfone) or poly(aryl ether ketone) is recovered from the reaction medium by filtration or wherein the side products of step (i) are separated by distillation.

7. The method according to claim 1, wherein the step (i) is carried out in the presence of a mixture of the organic base and an inorganic base.

8. The method according to claim 1, wherein the step (i) is carried out in the absence of solvent.

9. The method according to claim 1, wherein the step (i) is carried out at a temperature of at least 150° C.

10. The method according to claim 1, wherein the step (i) is carried out at a temperature of at most 400° C.

11. The method according to claim 1, wherein the monomer (M1) is selected from the group consisting of 2,2-bis(4-hydroxyphenyl)propane, bis(4-hydroxyphenyl)sulfone, and mixtures thereof, and wherein the monomer (M2) is selected from the group consisting of 4,4'-difluorodiphenyl sulfone (DFDPS), 4,4'-dichlorodiphenyl sulfone (DCDPS), and mixtures thereof.

12. The method according to claim 1, wherein the monomer (M3) is selected from the group consisting of 4-chloro-4'-hydroxydiphenylsulfone, 4-fluoro-4'-hydroxybenzophenone, and mixtures thereof.

13. The method according to claim 1, wherein the organic base is selected from the group consisting of methylamine, dimethylamine, dimethyldiethylamine, dimethyl-sec-butylamine, tri-n-propylamine, 1-methyl-2-n-butyl-Δ2-pyrroline, 1-ethyl-2-methyl-Δ2-pyrroline, 1-n-propylpiperidine, triethylamine, dimethyl-n-butylamine, dimethyl-isopropylamine, dimethyl-t-butylamine, tri-n-butylamine, 1,2-dimethylpyrrolidine, 1-methyl-2-n-butylpyrrolidine, 1-ethyl-2-methylpyrrolidine, 1-n-butyl-2-methylpyrrolidine, 1-ethyl-2-methylpyrrolidine, 1,2-dimethylpiperidine, 1-ethyl-2-methyl-Δ2-tetrahydropyridine, 1,5-diazabicyclo[4.3.0]non-5-ene (DBN), 1,8-diazabicyclo[5.4.0]undec-7-ene (DBU), 1,4-diazabicyclo[2.2.2]octane, 1,1,3,3-tetramethylguanidine, lysine, arginine, guanidine, and mixtures thereof.

14. The method according to claim 1, wherein the organic base is 1,8-diazabicyclo[5.4.0]undec-7-ene (DBU) or triethylamine.

15. The method according to claim 1, wherein the poly(aryl ether) has a weight average molecular mass of at least 3000 g/mol.

16. The method according to claim 1, wherein the poly(aryl ether) has a weight average molecular mass of at least 4000 g/mol.

17. The method according to claim 1, wherein the poly(aryl ether) has a weight average molecular mass of at least 5000 g/mol.

18. The method according to claim 1, wherein the ratio of the total number of moles of [H$^+$ AS] over the total number of moles of hydroxyl groups of the monomer (M1) and (M3) is of at least 1.25.

* * * * *